May 22, 1923.

J. BURKE

MAGNET FRAME

Filed Nov. 6, 1919

Inventor

James Burke

By Edwards, Sager & Bower

Attorney

Witness

May 22, 1923.                                            1,456,120
J. BURKE
MAGNET FRAME
Filed Nov. 6, 1919          2 Sheets-Sheet 2

Inventor
James Burke
By Edwards, Sager & Bower
Attorneys

Witness

Patented May 22, 1923.

1,456,120

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

MAGNET FRAME.

Application filed November 6, 1919. Serial No. 336,212.

*To all whom it may concern:*

Be it known that I, JAMES BURKE, a citizen of the United States, residing at Erie, in the county of Erie and State of Pennsylvania, have invented certain new and useful Improvements in Magnet Frames, of which the following is a specification.

This invention relates to frames for electrical machinery and particularly to frames for electric generators or motors. The object of the invention is to provide a motor or generator frame requiring a minimum of space and material and at the same time permitting the efficient development of the desired power.

In the accompanying drawings.

Figure 1:
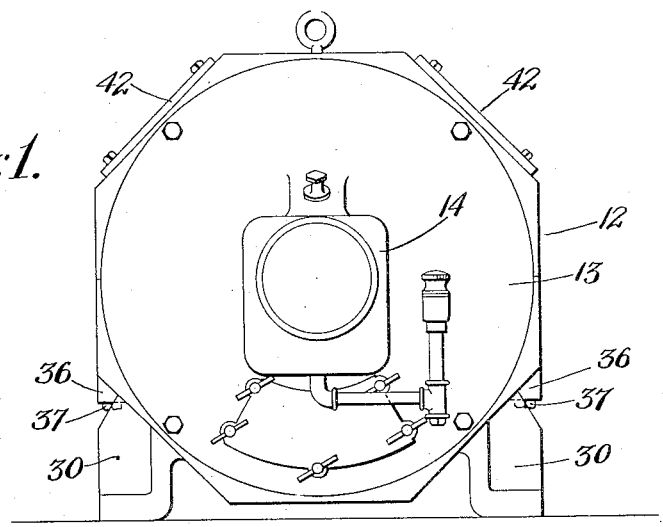
Fig. 1 is an end elevation of a machine illustrating one embodiment of the invention as applied, for instance to a motor for ammunition hoists on a battleship where the available space is very limited.
Figure 2:
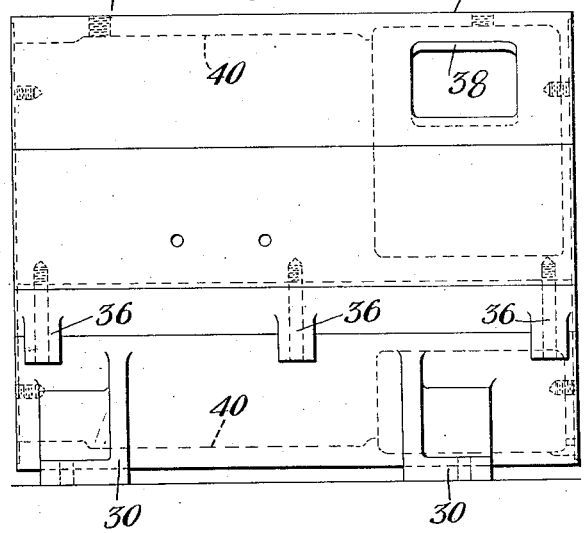
Figs. 2 and 3 are side and end views of the frame structure for the same.
Figure 3:
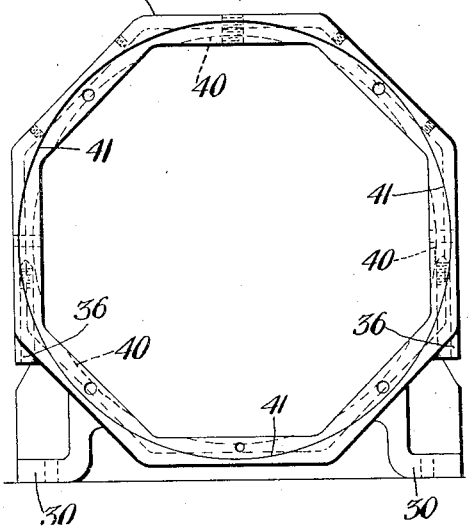

In the motor frame shown in the drawings and illustrating one embodiment of the invention the structure comprises a body portion 12 generally octagonal in sectional outline and end plates 13 bolted thereto and carrying the armature bearings 14. The body portion and end plates protectively house the windings and rotary parts in watertight manner and the motor is particularly adapted for use under severe conditions of service, for instance in connection with ammunition hoists of battleships where the space is extremely restricted and full power performance is required without danger of overheating though the working parts are enclosed. Under these conditions it is highly desirable to have the field frame and magnetic circuits occupy as little space as possible so that ample room will be left for oversized armature parts to deliver full power without danger of over-concentration of current and consequent heating.

Figure 4:
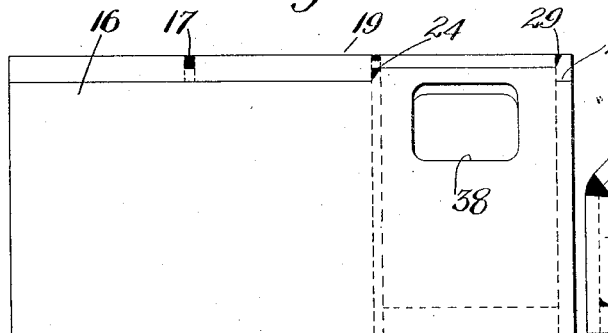
Figs. 4 and 6 are side views and Figs. 5 and 7 end views of the top and bottom of the frame detached.
Figure 5:
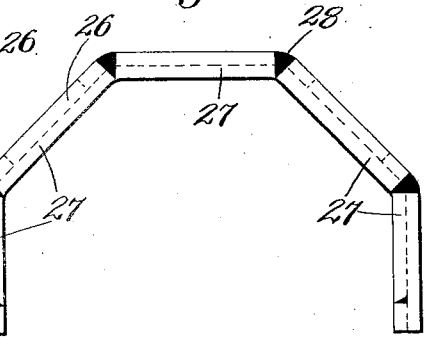
Figure 6:
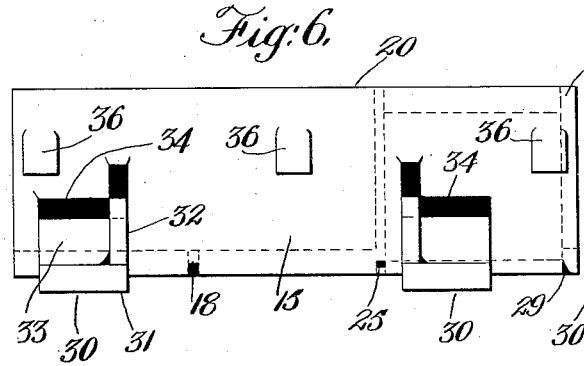
Figure 7:
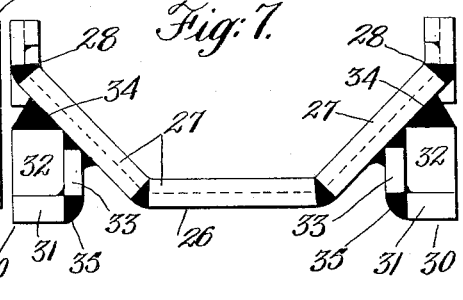
Figure 8:
Figs. 8 to 11 are end views of frame parts illustrating their formation.
Figure 10:
Figure 9:
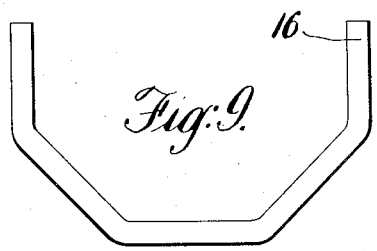
Figure 11:

In the motor frame of this invention the body portion is built up of cold rolled steel plating shaped most advantageously and welded together to form a complete frame and housing. In the formation of the frame flat cold rolled steel plates of desired thickness are cut to proper sized rectangles and bent to semi-octagonal shape 15 and 16 (Figs. 8 and 9) for the top and bottom respectively and two of each of these forms are welded together as at 17 and 18 (Fig. 4) to form the top 19 and bottom 20 of the magnet frame. A brush housing 21 is provided at the end of this magnet frame by similarly forming thinner strips of steel 22, 23 (Figs. 10 and 11) and welding them at 24, 25 to the ends of top 19 and bottom 20 of the magnet frame. A reinforcement flange 26 is then provided around the outer end of the brush housing by welding strips 27 in place at 28, 29 and feet 30 are provided one on each side built up of unit blocks 31, 32 and 33 welded together and to the outside of the magnet frame and housing as shown at 34, 35. Bosses 36 are added to the bottom part 20 by welding to receive the heads of bolts 37 connecting the top and bottom of the magnet frame, and hand holes 38 are cut in the brush housing.

After the parts are welded as above described the frame is finished by machinery. The magnet frame is bored out as at 40 to receive the field magnets and the ends are counter sunk as at 41 to receive the end brackets or plates 13. The parts are also drilled and tapped for the attaching and lifting bolts and the welding roughness smoothed off and covers 42 provided for the brush housing hand holes 38.

The cold rolled steel magnet frame is an efficient conductor of the magnetic field flux and saves greatly in the amount of space required over cast frames hitherto used, permitting full size design for the armature parts and preventing over heating. At the same time the construction of these welded frames is much less expensive than the cast frames and may be more readily accomplished without dependence on extensive foundry and casting installation.

I claim:

1. The method of forming an electric motor or generator frame comprising bending strips of metal stock to the form of the field frame in a circumferential direction, welding said strips together at a joint at right angles to the axis of the frame, and internally boring said frame to size and true the surfaces.

2. The method of forming an electric motor or generator frame comprising bending strips of metal stock to the form of the field frame in a circumferential direction, welding said strips together at a joint at right angles to the axis of the frame, bending thinner strips of metal to the form of the field frame in a circumferential direction, welding said thinner strips to said first named strips at a joint at right angles to the axis of the frame, and internally boring said frame to size and true the surfaces.

3. The method of forming an electric motor or generator frame comprising bending strips of metal stock to the form of the field frame in a circumferential direction, welding said strips together at a joint at right angles to the axis of the frame, bending thinner strips of metal to the form of the field frame in a circumferential direction, welding said thinner strips to said first named strips at a joint at right angles to the axis of the frame, and welding heavy strips along the outer edge of said thinner strips.

JAMES BURKE.